(12) United States Patent
Ribiere et al.

(10) Patent No.: US 7,720,010 B2
(45) Date of Patent: May 18, 2010

(54) TREE BASED WIRELESS MESH FOR AN OSPF NETWORK WITH INTRA-TREE COMMUNICATION OPTIMIZATION

(75) Inventors: Vincent Ribiere, Domain des Colibris (FR); Abhay Roy, Santa Clara, CA (US); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 388 days.

(21) Appl. No.: 11/537,298

(22) Filed: Sep. 29, 2006

(65) Prior Publication Data

US 2008/0080401 A1    Apr. 3, 2008

(51) Int. Cl.
*H04L 12/28* (2006.01)
*H04W 4/00* (2009.01)

(52) U.S. Cl. .................... 370/256; 370/338; 370/351; 370/389; 370/401

(58) Field of Classification Search ............... 307/256, 307/338, 351, 401
See application file for complete search history.

(56) References Cited

U.S. PATENT DOCUMENTS

| | | | |
|---|---|---|---|
| 7,031,288 B2 | 4/2006 | Ogier | |
| 2001/0040895 A1 | 11/2001 | Templin | |
| 2002/0150094 A1* | 10/2002 | Cheng et al. | 370/389 |
| 2003/0095504 A1* | 5/2003 | Ogier | 370/235 |
| 2004/0233859 A1* | 11/2004 | Martin | 370/254 |
| 2005/0265259 A1 | 12/2005 | Thubert et al. | |
| 2006/0010249 A1* | 1/2006 | Sabesan et al. | 709/238 |
| 2007/0053309 A1* | 3/2007 | Poojary et al. | 370/256 |
| 2007/0183334 A1* | 8/2007 | White et al. | 370/238 |
| 2007/0242607 A1* | 10/2007 | Sadler et al. | 370/238 |
| 2007/0245034 A1* | 10/2007 | Retana et al. | 709/238 |
| 2007/0258387 A1* | 11/2007 | Patel et al. | 370/254 |

OTHER PUBLICATIONS

PCT Notification of Transmittal of the International Search Report and the Written Opinion of the International Searching Authority, or the Declaration, International Application No. PCT/IB07/00526, International Filing Date: Feb. 26, 2007, Date of Mailing Jun. 18, 2008, 10 pages.

* cited by examiner

*Primary Examiner*—Huy D Vu
*Assistant Examiner*—Brandon Renner
(74) *Attorney, Agent, or Firm*—Cesari and McKenna, LLP

(57) ABSTRACT

A system for providing a tree topology for a network having an interior gateway protocol. A first router receives a hello message from all connected routers in the network. The hello messages include tree topology information. The first router then uses the tree topology information to determine a parent of the router. The first router then establishes connections with directly connected routers at the same level in the tree topology. The first router also generates link messages that include all of the prefixes for children of the first router and broadcasts the link messages.

24 Claims, 4 Drawing Sheets

TREE BASED WIRELESS MESH FOR AN OSPF NETWORK WITH INTRA-TREE COMMUNICATION OPTIMIZATION

FIELD OF THE INVENTION

This invention relates to a routing system in a network. More particularly, this invention relates to a process for generating a tree topology of the network in the routing system. Still more particularly, this invention relates to a process in which the routing system receives topology information from other routing systems to determine a parent system in the network and then to establish connection to other routing systems at the same level in the tree topology.

PRIOR ART

In most digital networks, it is a problem to reduce the amount of administrative data transmitted over the network to maintain network connections. The data throughput of the network is degraded by this administrative data. For purposes of this discussion, data throughput of a network is the amount of application data that can be transmitted over the network in a given time frame. Furthermore, administrative data is data transmitted between routing systems over the network to support the connections in the network and application data is data that may be used to execute software by a receiving system. Furthermore, the administrative data also increase the convergence time of the system. For purposes of this discussion, convergence time is the time needed by the network to establish all adjacencies between systems in order to transmit data over the network.

Networks that have an interior gateway protocol, such as Open Shortest Path First (OSPF), must transmit a lot of administrative data between routing systems in order for each routing system in the network to maintain updated records of the connections in the network to determine a path for transmitting application data over the network. Thus, administrative data is constantly being transmitted between the routing systems in the network to update the connections between routing systems. In an interior gateway protocol, a routing system in the network establishes an adjacency with all routing systems that have a bi-directional connection with the routing system. Then, when the routing system receives administrative data from one connected routing system, the routing system forwards the data to all connected routing systems. Thus, administrative data traffic increases in the network as the number of connections in the network increases.

The increase in administrative data traffic is a particular concern in a network in which some network connections are made via a wireless connection. For purposes of this discussion, a wireless connection is any connection that uses Radio Frequency (RF), infrared signals, or any other form of communication in which data is transmitted from a first system to a second system which are not physically connected. One reason that this is a problem in a wireless network is that the bandwidth of the signals used for communication is often limited. Since there is a small bandwidth to use for communication limits the throughput of the network. Thus, there is a need in the art for a system that reduces the administrative data transmitted over the network to increase network throughput.

BRIEF DESCRIPTIONS OF THE DRAWINGS

The features and advantages of this invention are described in the following detailed description and are shown in the following drawings.

Figure 3:
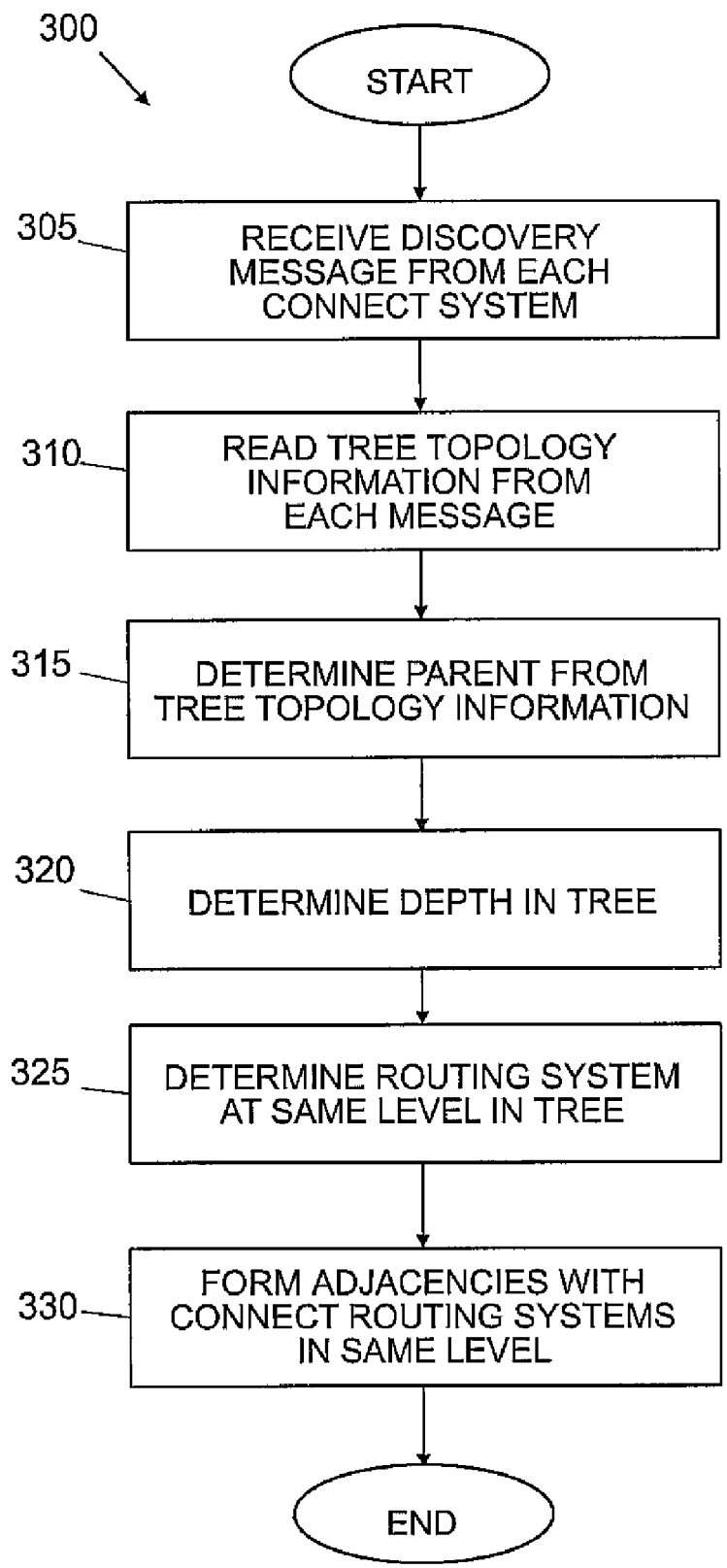
Figure 4:
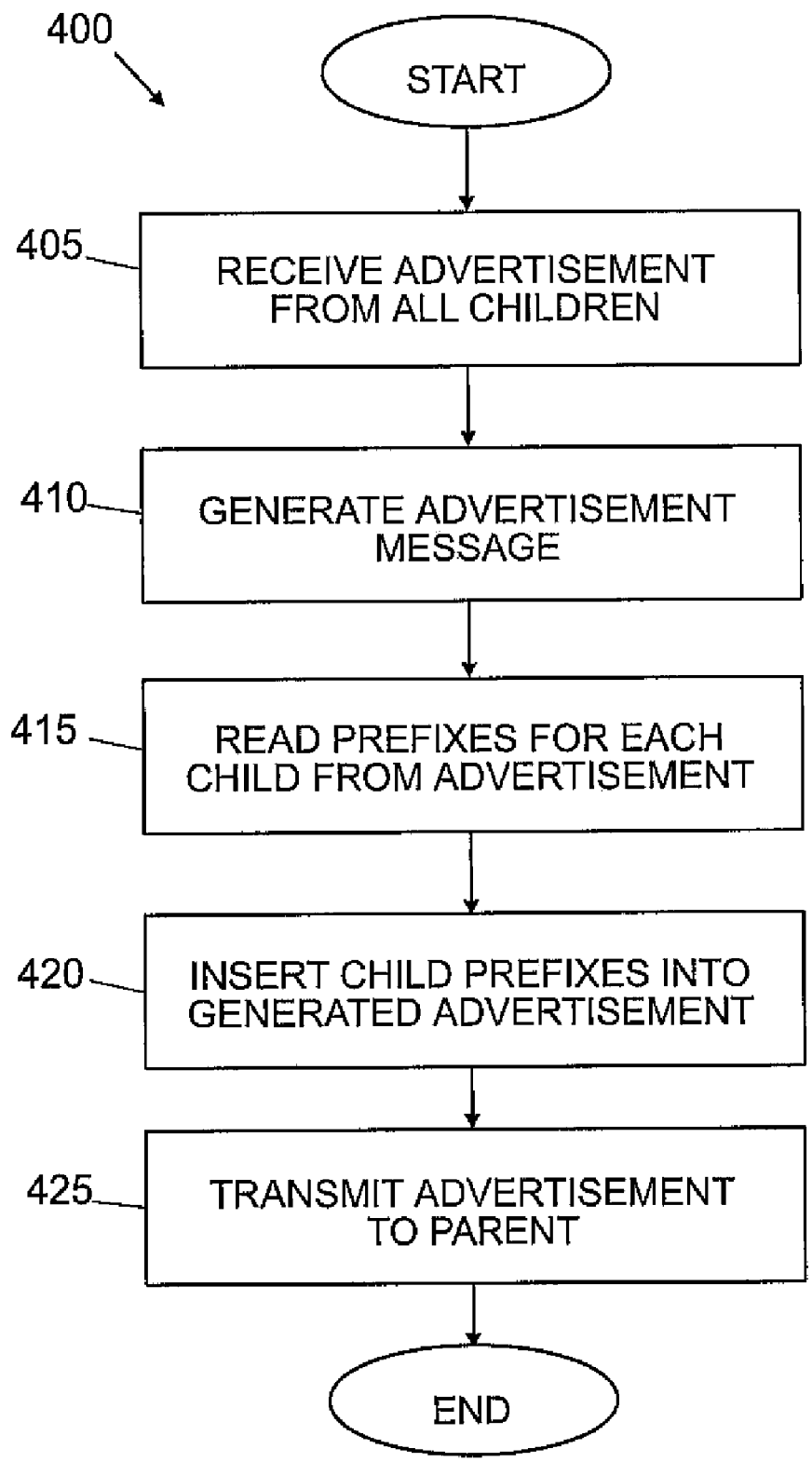

FIG. 3 illustrating a flow diagram of a process performed by a routing system to connect to the network having a tree topology in accordance with this invention; and FIG. 4 illustrating a flow diagram of a process for generating and transmitting link advertisements in accordance with this invention.

DETAILED DESCRIPTION

This invention relates to a system for providing a tree topology for a network having an interior gateway protocol, such as OSPF. The tree topology reduces flooding which will increase network throughput and decrease the convergence time of the routing protocol. In accordance with the present invention, the router system performs applications which provide the tree topology in the network. These applications may be performed as software, hardware, and/or firmware that are included in each router system in the network.

Figure 1:
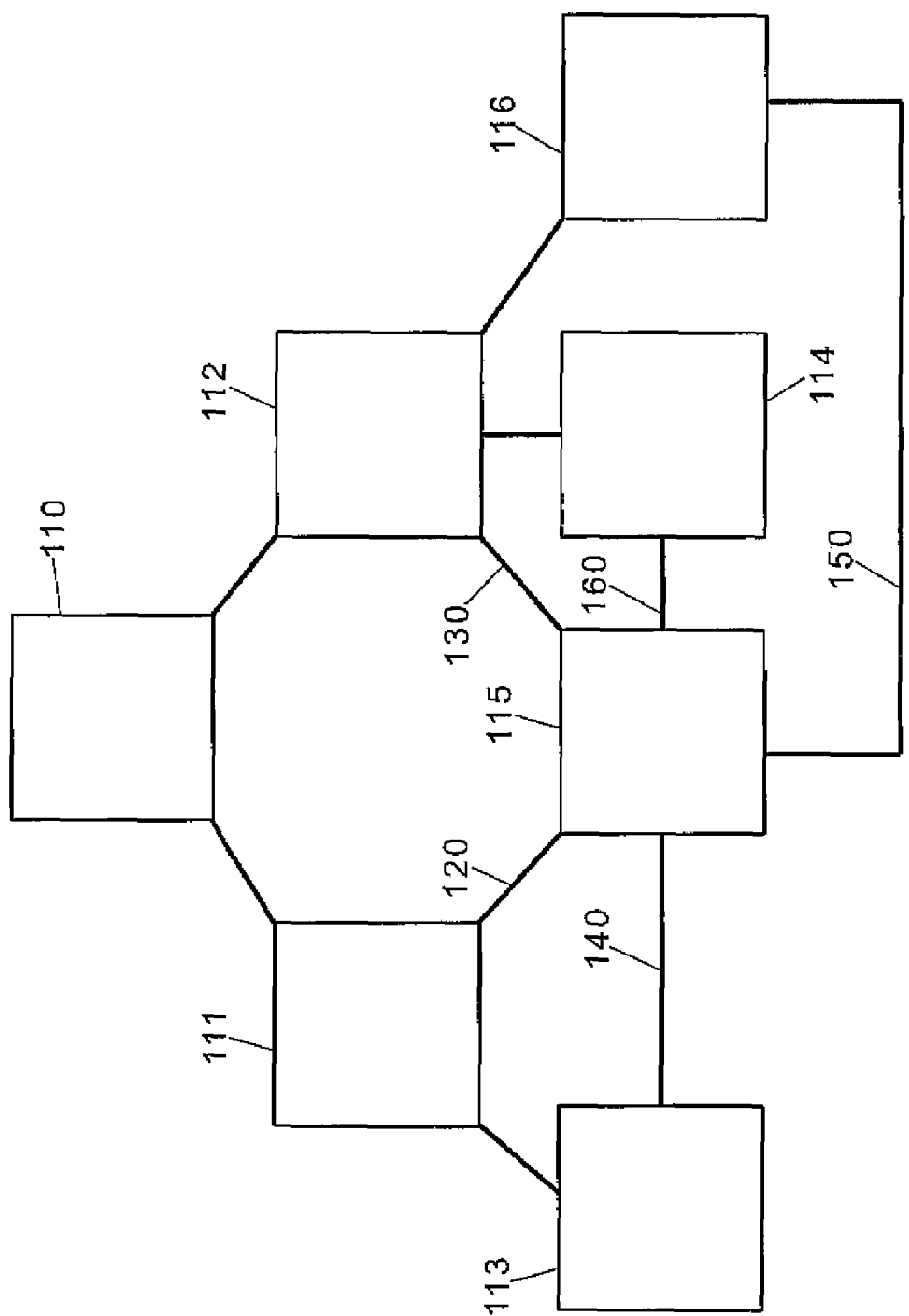
FIG. 1 illustrates a diagram of a network having a tree topology in accordance with this invention.

FIG. 1 illustrates a network 100 using an interior gateway protocol, such as OSPF, and having a tree topology in accordance with this invention. In the tree topology of network 100, routing system 110 is the trunk or base of the tree topology. Routing systems 111 and 112 are directly connected to router 110 and are children of routing system 110. Routing system 113 is a child of routing system 111 and routing systems 114-116 are children of router system 112. One skilled in the art will recognize that network 100 may include any number of routing systems which may have any number of connections to other routing systems and it is left to those skilled in the art to configure the network.

In the preferred embodiment, routing systems 110-116 use OSPF to route data being transmitted over the network. In a convention network using OSPF, there is only an area 0 and all areas of the network are connected to area 0. In a tree topology in accordance with this invention, there may be sub-areas in the network that are not directly connected to area 0. Instead, a parent system in the sub-area may provide a link for children of the parent to connect to area 0.

In order to join a tree topology, a router system must select a parent routing system. The parent routing system is in a level of the tree immediately above the level of the child routing system. In some instances, such as is shown for routing system 115, a routing system may be connected to more than one routing system in the next level. As shown, routing system 115 is connected to routing system 111 via path 120 and routing system 112 via path 130. Thus, routing system 115 must select a parent from one of the two routing systems.

In this embodiment, routing system 115 selects routing system 112 as its parent. Thus, routing system 115 sets a default path to routing system 112 and ignores the connection to routing system 111 via path 120 which is represented by a dashed line to indicate it is ignored.

Routing systems at the same level of the tree topology may then form adjacencies with other routing systems in the level. For example, routing system 115 is connected to routing system 114 via path 160 and routing system 116 via path 150. In some embodiments, the routing systems on the same level do not have to have a common immediate parent to form an adjacency. For example, the parent of routing system 115 is routing system 112 and the parent of routing system 113 is routing system 111. However, routing system 115 is connected to routing system 113 via path 140.

In the tree topography, data may be transmitted between two routing systems on the same level that are directly connected even if the systems do not have a common parent. For example, routing system 115 may transmit data to routing system 113 via path 140.

However, if two routing systems on the same level, but are not directly connected to one another, are transmitting data to one another, the data must be sent to routing systems in higher levels until the first common ancestor of the routing system is encountered. The common ancestor then transmits the data down the tree topology to the receiving system.

For example, routing system 113 is transmitting data to routing system 116. There is no direct connection between routing systems 113 and 116. Thus, routing system 113 transmits the data to routing system 111. Routing system 111 is also not directly connected to routing system 116 and transmits the data to routing system 110. Routing system 110 is the root of the tree and is the first common ancestor of routing systems 113 and 116. Routing system 110 then transmits the data down the branch of the tree topology that includes routing system 116. Thus, the data is transmitted from routing system 110 to routing system 116 via routing system 112.

In order to reduce network data, routing systems hide the routes learned by children of the routing system from the parent of the router system in accordance with this invention. In some embodiments, the routes are hidden by a child only transmitting link advertisement messages to its parent. The link state advertisement includes the address prefixes of interfaces of the router system as well as all of the address prefixes of the children of the router system. For example, routing system 112 generates a link state advertisement message that includes the prefixes of all the interfaces of routing system 112 and all of the prefixes of routing systems 114-116. The link state advertisement is then transmitted from routing system 112 to routing system 110. This minimizes the amount of data flooded over the network while maximizing the number of routes.

On the other hand, a parent routing system does not send link state advertisements to children routing systems. This reduces the traffic needed to maintain connections as link states do not have to be sent down the tree by routing systems as the links are not needed by the children.

Furthermore, this localizes flooding of administrative data when there is a change in the system. Flooding is reduced because messages are only sent up the tree to the ancestors of the routing system where a change occurred. For example, routing system 116 disconnects from the network. When the change is detected by routing system 112. A link state advertisement message is sent to routing system 110.

Figure 2:
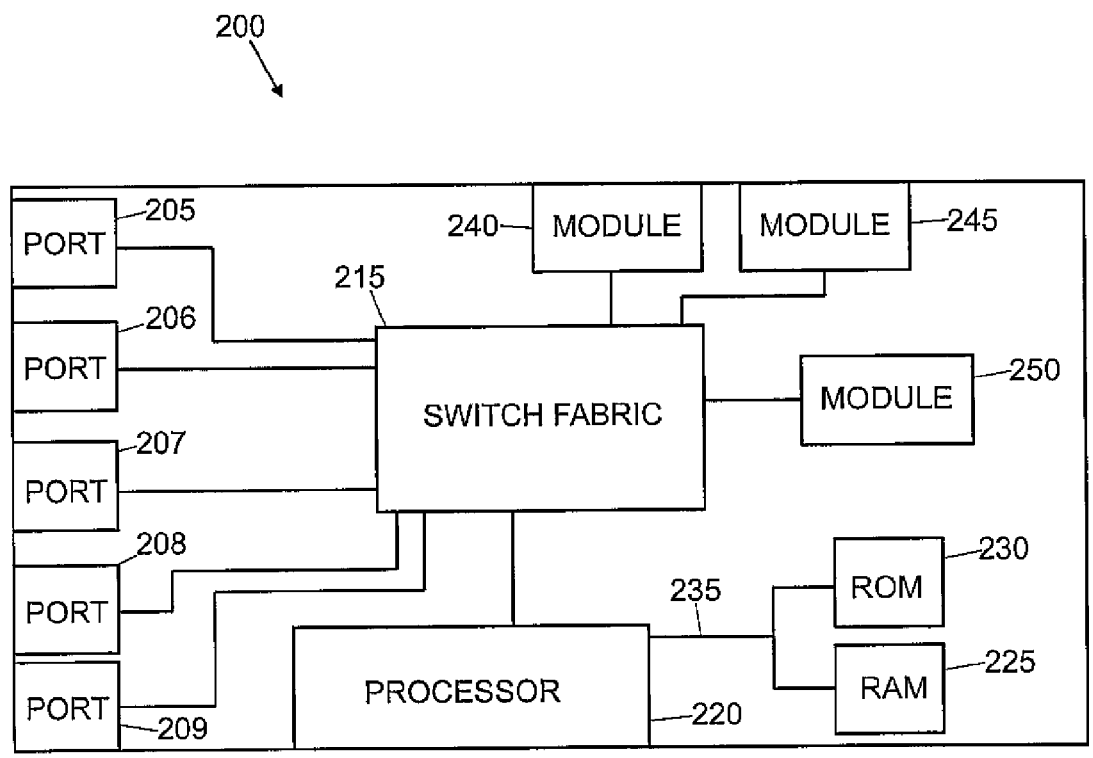
FIG. 2 illustrates a block diagram of a router system that performs processes for providing a tree topology for a network in accordance with this invention.

In order to provide the tree topology, the configuration of the routing systems in the network must be modified to operate in a tree topology. FIG. 2 illustrates an exemplary embodiment of a routing system that performs the processes to provide a tree topology in accordance with this invention.

FIG. 2 shows a router 200. Routing systems 110-116 (Shown in FIG. 1) are all an example of router 200. Router 200 is a switching system that transmits digital data, in the form of packets between processing systems connected to a network. One skilled in the art will recognize that router 200 may be a router, switch or any other processing system that receives and transmits digital data.

Router 200 includes ports 205-209. Ports 205-209 connect router 100 to other processing systems in a network. The other processing systems that may be connected include computers, other routers or any other digital processing systems. One skilled in the art will further recognize that ports 205-209 are shown for exemplary purposes only and the exact number and configuration of the ports are left to one skilled in the art designing a specific router.

Ports 205-209 are connected to switch circuitry 215. Switch circuitry 215 is circuitry that transmits received packets to the proper ports for delivery to the proper address. One skilled in the art will recognize that there are many different types of circuitry that may be used to transmit packets between proper ports and an explanation of the switching circuitry is not critical to this invention and is omitted for brevity.

Processing unit 220 is connected to switching circuitry 215. Processing unit 220 is a processor, microprocessor, or any combination of processors and microprocessors that execute instructions to perform applications for performing functions in router 100. Processing unit 220 is also connected to a volatile memory 225 and a non-volatile memory 230 via memory bus 235.

Volatile memory 225 is a memory such as a Random Access Memory (RAM). A volatile memory stores instructions and data used by processing unit 220 to perform applications. One such application is a router operating system. The routing operating system is applications which allow router 200 to perform other applications that can provide the functions of router 200. An example of a router operating system is Inter-network Operating System (IOS) designed by Cisco Systems Inc. One Skilled in the art will recognize that many different types of memory may be used as a non-volatile memory such SRAM and DRAM.

Non-volatile memory 230 is a memory such as a Read Only Memory (ROM). Non-volatile memory 230 stores configuration and other vital information for router 200. One skilled in the art will recognize that there are many different types of memory that may be used as a non-volatile memory.

Modules 240, 245, and 250 are connected to switching circuitry 215. Modules 240, 245, and 250 are device and/or software that prepare specific features in router 200. An example of a module is a Voice Over Internet Protocol (VoIP) module for providing telephonic communications to processing devices connected to router 200. One skilled in the art will recognize that the number of modules and the functions each module provides may be determined by one skilled in the art designing a particular router.

In order to provide a tree topology, each routing system in the network must be able to determine the position of the system in the tree. FIG. 3 illustrates an exemplary process 300 for determining a parent of a routing system when the routing system is connected to the network.

Process 300 begins in step 305 with the routing systems receiving discovery messages from all of the other routing systems in the network. In the preferred exemplary embodiment, the discovery message is a hello message in the OSPF protocol. In order to allow the routing systems to determine a parent, the discovery message includes tree topology level information. Some examples of tree topology information may include tree depth, bandwidth and Signal to Noise Ratio (SNR). Other information may include an address of parent, addresses of children, and/or a number of children of the routing system.

In step 310, the routing system reads the tree topology information from each of the received discovery messages. The tree topology information is then used to determine the parent of the routing system in step 315. Some algorithms for selecting a parent may include, but are not limited to, selecting a routing system with the lowest level, selecting a routing system with the lowest level and highest bandwidth, and selecting a routing system with lowest depth and least number of children. One skilled in the art will recognize that many other algorithms may be used as long as the selected algorithm can reduce the selection to one parent.

After the parent is selected, the routing system determines a level in the tree of the system in step 320. This may be done by incrementing or decrementing the level of the parent depending on the method of numbering the levels. Other means of determining the level of the routing system in the tree topology include, but are not limited to, determining the level of other children of the determined parent.

In step 325, the routing system then determines the other routing systems that are connected to the routing system and are on the same level of the tree topology as the routing system. The routing system then forms adjacencies with these routing systems in step 330 and process 300 ends.

In order to reduce the data traffic needed to maintain a record of connections in the network, a child routing system only transmits a link advertisement to its parent. The sent advertisements include the prefix addresses for each interface of the routing system as well as the prefixes for each of its children. This limits advertisements to only being sent in a direction toward the root of the tree topology and not away from the root to children systems. FIG. 4 illustrates a flow diagram of an exemplary process for generating and transmitting link advertisement messages in accordance with this invention.

Process 400 begins in step 405 with the routing system receiving advertisement messages from all of the children of the routing system. In the preferred exemplary embodiment, the advertisement messages are Link State Advertisements (LSA). The advertisement message includes all of the prefixes for the child from which the message is received.

In step 410, the routing system generates, an advertisement message to transmit to the parent routing system. In the preferred embodiment, this message is an LSA which has link scoping. In the preferred embodiment, intra area prefixed LSAs provide local flooding for routing systems in an area of the tree topology i.e. at the same level in the tree.

The routing system then reads all of the prefixes from each advertisement message received from a child routing system in step 415. The read prefixes are then inserted into the generated advertisement message in step 420. The advertisement is then transmitted from the routing system to the parent routing system in step 425 and process 400 ends.

The above description describes exemplary embodiments of a system for providing a tree topology in a network in accordance with this invention. It is envisioned that one skilled in the art can and will design alternative systems that infringe either literally or through the Doctrine of Equivalents.

What is claimed is:

1. A method for providing a tree topology in an interior gateway protocol to reduce network traffic comprising:
   receiving a discovery message from each routing system connected to a first routing system wherein each discovery message includes tree topology level information;
   determining a parent routing system of said first routing system in said tree topology of said network from said tree topology level information in each said discovery message received from each said routing system;
   determining a depth in said tree topology of said network of said first routing system and said parent of said first routing system;
   in response to determining said depth, forming adjacencies with all routers at a same depth in said tree topology connected to said first routing system;
   generating a connection advertisement message that includes prefixes learned from one or more child routing systems of said first routing system in said tree topology; and
   transmitting said generated connection advertisement message from said first routing system to said parent routing system of said first routing system in the tree topology, while not sending the generated connection advertisement message to any of said one or more child routing systems of the first routing system in the tree topology.

2. The method of claim 1 further comprising:
   transmitting said connection advertisement message from a first routing system to all routing systems in said network having a same tree depth in said tree topology as said first routing system.

3. The method of claim 1 wherein said connection advertisement message is a link state advertisement.

4. The method of claim 1 further comprising:
   establishing a default route from said first routing system to said parent routing system responsive to a determination of said parent routing system.

5. The method of claim 1 further comprising:
   hiding all routes learned by said first routing system from said parent routing system.

6. An apparatus for providing a tree topology of a network using an interior gateway protocol to reduce network traffic comprising:
   circuitry configured to receive a discovery message from each routing system connected to a first routing system wherein each discovery message includes tree topology level information;
   circuitry configured to determine a parent routing system of said first routing system in said tree topology of said network from said tree topology level information in each said discovery message received from each said routing system;
   circuitry configured to determine a depth in said tree topology of said network of said first routing system and said parent of said first routing system;
   circuitry configured to form adjacencies with all routers at a same depth in said tree topology connected to said first routing system in response to the determination of said depth;
   circuitry configured to generate a connection advertisement message that includes prefixes learned from one or more child routing systems of said first routing system in said tree topology; and
   circuitry configured to transmit said generated connection advertisement message from said first routing system to said parent routing system of said first routing system in the tree topology, while not sending the generated connection advertisement message to any of said one or more child routing systems of the first routing system in the tree topology.

7. The apparatus of claim 6 further comprising:
circuitry configured to transmit said connection advertisement message from a first routing system to all routing systems in said network having a same tree depth in said tree topology as said first routing system.

8. The apparatus of claim 6 wherein said connection advertisement message is a link state advertisement.

9. The apparatus of claim 6 further comprising:
circuitry configured to establish a default route from said first routing system to said parent routing system responsive to a determination of said parent routing system.

10. The apparatus of claim 6 further comprising:
circuitry configured to hide all routes learned by said first routing system from said parent routing system.

11. A computer readable medium carrying one or more instructions for providing a tree topology over a network having an interior gateway protocol, the one more instructions including instructions which executed by one or more processors, cause the one or more processors to:
receive a discovery message from each routing system connected to a first routing system wherein each discovery message includes tree topology level information;
determine a parent routing system of said first routing system in said tree topology of said network from said tree topology level information in each said discovery message received from each said routing system;
determine a depth in said tree topology of said network of said first routing system and said parent of said first routing system;
form adjacencies with all routers at a same depth in said tree topology connected to said first routing system in response to the determination of said depth;
generate a connection advertisement message that includes prefixes learned from one or more child routing systems of said first routing system in said tree topology; and
transmit said generated connection advertisement message from said first routing system to said parent routing system of said first routing system in the tree topology, while not sending the generated connection advertisement message to one or more child routing systems of the first routing system in the tree topology.

12. The computer readable medium of claim 11 wherein the one more instructions further include instructions which executed by one or more processors, cause the one or more processors to:
transmit said connection advertisement message from a first routing system to all routing systems in said network having a same tree depth in said tree topology as said first routing system.

13. The computer readable medium of claim 11 wherein said connection advertisement message is a link state advertisement.

14. The computer readable medium of claim 11 wherein the one more instructions further include instructions which executed by one or more processors, cause the one or more processors to:
establish a default route from said first routing system to said parent routing system responsive to a determination of said parent routing system.

15. The computer readable medium of claim 11 wherein the one more instructions further include instructions which executed by one or more processors, cause the one or more processors to:
hide all routes learned by said first routing system from said parent routing system.

16. A method comprising:
receiving an interior gateway protocol message at a first routing system in a network;
determining a parent routing system of the first routing system in a tree topology defined for the network using the interior gateway protocol message, the tree topology having a plurality of levels, wherein each routing system in the tree topology, other than a base routing system, has a parent in a level immediately above the routing system in the tree topology;
determining a level in the tree topology of the first routing system;
determining other routing systems that are connected to the first routing system and are on a same level of the tree topology as the first routing system;
in response to the determining other routing systems that are connected to the first routing system and are on a same level of the tree topology as the first routing system, forming, by the first routing system, adjacencies with the other routing systems; and
limiting flooding of interior gateway protocol link state advertisement messages (LSAs) based upon the tree topology by generating LSAs at the first routing system that include prefixes learned from one or more child routing systems of the first routing system in the tree topology, and transmitting the generated LSAs only to the parent routing system of the first routing system in the tree topology, while not sending the generated LSAs to one or more child routing systems of the first routing system in the tree topology.

17. The method of claim 16 wherein the generated LSAs further include prefixes of interfaces of the first routing system.

18. The method of claim 16 wherein the generated LSAs are LSAs having link-local scoping.

19. The method of claim 16 wherein the interior gateway protocol is an Open Shortest Path First (OSPF) protocol.

20. A routing system comprising:
a plurality of ports;
a processing unit; and
a memory configured to store instructions configured to, when executed by the processing unit, determine a parent routing system of the routing system in a tree topology defined using a message received on at least one of the plurality of ports, the tree topology having a plurality of levels, wherein each routing system in the tree topology, other than a base routing system, has a parent in a level immediately above the routing system in the tree topology, determine a level in the tree topology of the routing system, determine other routing systems that are connected to the routing system and are on a same level of the tree topology as the routing system, form adjacencies with one or more other routing systems on the same level of the tree topology as the routing system, limit flooding of link state advertisement messages (LSAs) based upon the tree topology by generation of LSAs that include prefixes learned from one or more child routing systems of the routing system in the tree topology and transmission via at least one of the plurality of ports of the generated LSAs to the parent routing system of the routing system in the tree topology, while not sending the generated LSAs to any of the one or more child routing systems of the routing system in the tree topology.

21. The routing system of claim 20 wherein the generated LSAs further include prefixes of interfaces of the first routing system.

22. The routing system of claim 20 wherein the generated LSAs are LSAs having link-local scoping.

23. The routing system of claim 20 wherein the message and the LSAs are part of an Open Shortest Path First (OSPF) protocol.

24. The routing system of claim 20 wherein the instructions are further configured to, when executed by the processing unit, transmit via at least one of the plurality of ports, LSAs to the one or more other routing systems routing system on the same level of the tree topology as the routing system.

\* \* \* \* \*